(12) United States Patent
Wang et al.

(10) Patent No.: US 8,848,621 B2
(45) Date of Patent: Sep. 30, 2014

(54) APPARATUS AND METHOD FOR CELL-BASED HIGHLY DETECTABLE PILOT MULTIPLEXING

(75) Inventors: Michael Mao Wang, San Diego, CA (US); Naga Bhushan, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 767 days.

(21) Appl. No.: 12/481,164

(22) Filed: Jun. 9, 2009

(65) Prior Publication Data

US 2009/0310552 A1  Dec. 17, 2009

Related U.S. Application Data

(60) Provisional application No. 61/060,680, filed on Jun. 11, 2008.

(51) Int. Cl.
*H04W 4/00* (2009.01)
*H04J 11/00* (2006.01)
*H04W 48/08* (2009.01)

(52) U.S. Cl.
CPC ........... *H04W 48/08* (2013.01); *H04J 11/0069* (2013.01)
USPC ............................. 370/329; 370/330; 370/431

(58) Field of Classification Search
USPC .......................................... 370/329, 330, 431
See application file for complete search history.

(56) References Cited

U.S. PATENT DOCUMENTS

| | | | | |
|---|---|---|---|---|
| 7,940,740 | B2* | 5/2011 | Krishnamurthy et al. | 370/344 |
| 8,010,117 | B1* | 8/2011 | Sigg et al. | 455/446 |
| 8,130,707 | B2* | 3/2012 | Iwai et al. | 370/329 |
| 8,139,672 | B2* | 3/2012 | Gore et al. | 375/295 |
| 2006/0209670 | A1 | 9/2006 | Gorokhov et al. | |
| 2007/0097897 | A1* | 5/2007 | Teague et al. | 370/312 |
| 2007/0211765 | A1* | 9/2007 | Vrcelj et al. | 370/503 |
| 2008/0261597 | A1* | 10/2008 | Hayama et al. | 455/436 |
| 2008/0310373 | A1* | 12/2008 | Wang et al. | 370/335 |
| 2009/0129344 | A1* | 5/2009 | Yousef | 370/336 |
| 2009/0219858 | A1* | 9/2009 | Liang et al. | 370/328 |
| 2009/0219884 | A1* | 9/2009 | Kwon et al. | 370/330 |
| 2009/0290502 | A1* | 11/2009 | Tinnakornsrisuphap et al. | 370/252 |
| 2010/0054184 | A1* | 3/2010 | Kishiyama et al. | 370/328 |

(Continued)

FOREIGN PATENT DOCUMENTS

| | | |
|---|---|---|
| CN | 1938601 A | 3/2007 |
| CN | 1968433 A | 5/2007 |

(Continued)

OTHER PUBLICATIONS

International Search Report & Written Opinion—PCT/US2009/046954, International Search Authority—European Patent Office—Oct. 9, 2009.

(Continued)

*Primary Examiner* — Farah Faroul
(74) *Attorney, Agent, or Firm* — Donald C. Kordich

(57) ABSTRACT

An apparatus and method for cell-based highly detectable pilot (HDP) multiplexing comprising determining if an HDP opportunity exists; selecting a subslot within the HDP opportunity for transmission of a HDP signal; and activating more than one sector within a cell for the transmission of the HDP signal.

35 Claims, 7 Drawing Sheets

MULTIPLEXING SCHEMES

SECTOR-BASED

CELL-BASED

(56) References Cited

U.S. PATENT DOCUMENTS

| | | |
|---|---|---|
| 2010/0157940 A1* | 6/2010 | Shitara .......................... 370/331 |
| 2010/0172311 A1* | 7/2010 | Agrawal et al. ............... 370/329 |
| 2010/0322184 A1* | 12/2010 | Xiao ............................. 370/330 |
| 2011/0149903 A1* | 6/2011 | Krishnamurthy et al. .... 370/330 |
| 2011/0176499 A1* | 7/2011 | Siomina et al. ............... 370/329 |
| 2011/0235597 A1* | 9/2011 | Montojo et al. .............. 370/329 |
| 2013/0215909 A1* | 8/2013 | Hupp et al. ................... 370/498 |

FOREIGN PATENT DOCUMENTS

| | | |
|---|---|---|
| JP | 2007089113 A | 4/2007 |
| WO | WO2005098466 | 10/2005 |
| WO | WO2007123364 A1 | 11/2007 |
| WO | WO 2007146952 A2 * | 12/2007 |
| WO | WO2008144450 | 11/2008 |

OTHER PUBLICATIONS

Wu, Qiang. Cdma2000 Highly Detectable Pilot, (6 pages), San Diego. California.92121, 2008 IEEE.

Taiwan Search Report—TW098119574—TIPO—Jul. 13, 2012.

* cited by examiner

| DATA 400 CHIPS | MAC 64 CHIPS | PILOT 96 CHIPS | MAC 64 CHIPS | DATA 400 CHIPS | DATA 400 CHIPS | MAC 64 CHIPS | PILOT 96 CHIPS | MAC 64 CHIPS | DATA 400 CHIPS |

FIG.3

| HDP 400 CHIPS | MAC 64 CHIPS | PILOT 96 CHIPS | MAC 64 CHIPS | HDP 400 CHIPS | HDP 400 CHIPS | MAC 64 CHIPS | PILOT 96 CHIPS | MAC 64 CHIPS | HDP 400 CHIPS |

FIG.4

MULTIPLEXING SCHEMES

SECTOR-BASED

CELL-BASED

APPARATUS AND METHOD FOR CELL-BASED HIGHLY DETECTABLE PILOT MULTIPLEXING

CLAIM OF PRIORITY UNDER 35 U.S.C. §119

The present Application for Patent claims priority to Provisional Application No. 61/060,680 entitled "Method and Apparatus for Sector Co-Transmission of Highly Detectable Pilot" filed Jun. 11, 2008, and assigned to the assignee hereof and hereby expressly incorporated by reference herein.

FIELD

This disclosure relates generally to apparatus and methods for pilot transmission for wireless transmission. More particularly, the disclosure relates to cell-based highly detectable pilot multiplexing.

BACKGROUND

Wireless communication systems provide a variety of communication services to mobile users that are away from the fixed telecommunications infrastructure or are moving. These wireless systems employ radio transmissions to interconnect mobile devices with various base stations in the service area. The base stations, in turn, are connected to mobile switching centers which route connections to and from the mobile devices to others on various communication networks such as the public switched telephony network (PSTN), Internet, etc. In this manner, users that are away from their fixed sites or are on the move may receive various communication services such as voice telephony, paging, messaging, email, data transfers, video, Web browsing, etc.

Due to the use of radio frequencies for wireless interconnection, all mobile users must agree on a common set of protocols to share the scarce radio spectrum allocated for wireless communication services. One important protocol relates to the access method used to connect multiple mobile devices to the wireless communication network. Various access methods include frequency division multiple access (FDMA), time division multiple access (TDMA), code division multiple access (CDMA), and orthogonal frequency division multiplex (OFDM).

SUMMARY

Disclosed are an apparatus and method for sector co-transmission of a highly detectable pilot. According to one aspect, a method for cell-based highly detectable pilot (HDP) multiplexing comprising determining if an HDP opportunity exists; selecting a subslot within the HDP opportunity for transmission of a HDP signal; and activating more than one sector within a cell for the transmission of the HDP signal.

According to another aspect, an apparatus for cell-based highly detectable pilot (HDP) multiplexing, the apparatus comprising a processor for determining if an HDP opportunity exists; for selecting a subslot within the HDP opportunity for transmission of a HDP signal; and for activating more than one sector within a cell for the transmission of the HDP signal.

According to another aspect, an apparatus for cell-based highly detectable pilot (HDP) multiplexing comprising means for determining if an HDP opportunity exists; means for selecting a subslot within the HDP opportunity for transmission of a HDP signal; and means for activating more than one sector within a cell for the transmission of the HDP signal.

According to another aspect, a computer-readable medium having a computer program comprising instructions, which when executed by at least one processor, operates cell-based highly detectable pilot (HDP) multiplexing, the computer program comprising instructions for determining if an HDP opportunity exists; instructions for selecting a subslot within the HDP opportunity for transmission of a HDP signal; and instructions for activating more than one sector within a cell for the transmission of the HDP signal.

According to another aspect, a method for receiving multiplexed cell-based highly detectable pilot (HDP) comprising receiving a HDP signal with a sector identifier by a user equipment, wherein the HDP signal was transmitted on more than one sector; determining whether the sector identifier belongs to a sector where the user equipment is located, wherein the sector is one of the more than one sector; and if the sector identifier belongs to the sector where the user equipment is located, processing the HDP signal to determine the location of the user equipment, or if the sector identifier does not belong to the sector where the user equipment is located, ignoring the HDP signal.

According to another aspect, an apparatus for receiving multiplexed cell-based highly detectable pilot (HDP) comprising means for receiving a HDP signal with a sector identifier by a user equipment, wherein the HDP signal was transmitted on more than one sector; means for determining whether the sector identifier belongs to a sector where the user equipment is located, wherein the sector is one of the more than one sector; and if the sector identifier belongs to the sector where the user equipment is located, means for processing the HDP signal to determine the location of the user equipment, or if the sector identifier does not belong to the sector where the user equipment is located, means for ignoring the HDP signal.

According to another aspect, a computer-readable medium having a computer program comprising instructions, which when executed by at least one processor, operates to receive multiplexed cell-based highly detectable pilot (HDP), the computer program comprising instructions for receiving a HDP signal with a sector identifier by a user equipment, wherein the HDP signal was transmitted on more than one sector; instructions for determining whether the sector identifier belongs to a sector where the user equipment is located, wherein the sector is one of the more than one sector; and if the sector identifier belongs to the sector where the user equipment is located, instructions for processing the HDP signal to determine the location of the user equipment, or if the sector identifier does not belong to the sector where the user equipment is located, instructions for ignoring the HDP signal.

Advantages of the present disclosure include improvement in pilot performance. It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The present disclosure uses some general terms relating to wireless communication systems and known to one skilled in the art. However, one skilled in the art would understand that such terms are equally applicable to specific generations of wireless communication standards. For example, the present disclosure uses terms such as highly detectable pilot (HDP), sector, cell and PN offset. In one aspect, these terms and the concepts expressed relating to these terms are equally applicable to different generation wireless communication system, for example, it is applicable to a $4^{th}$ generation wireless communication system (4G) Long Term Evolution (LTE) wherein: a) positioning reference signal (PRS) is used instead of highly detectable pilot (HDP), b) cell is used instead of sector, c) eNodeB is used instead of cell, and d) physical cell identity (PCI) is used instead of PN offset.

Figure 1:
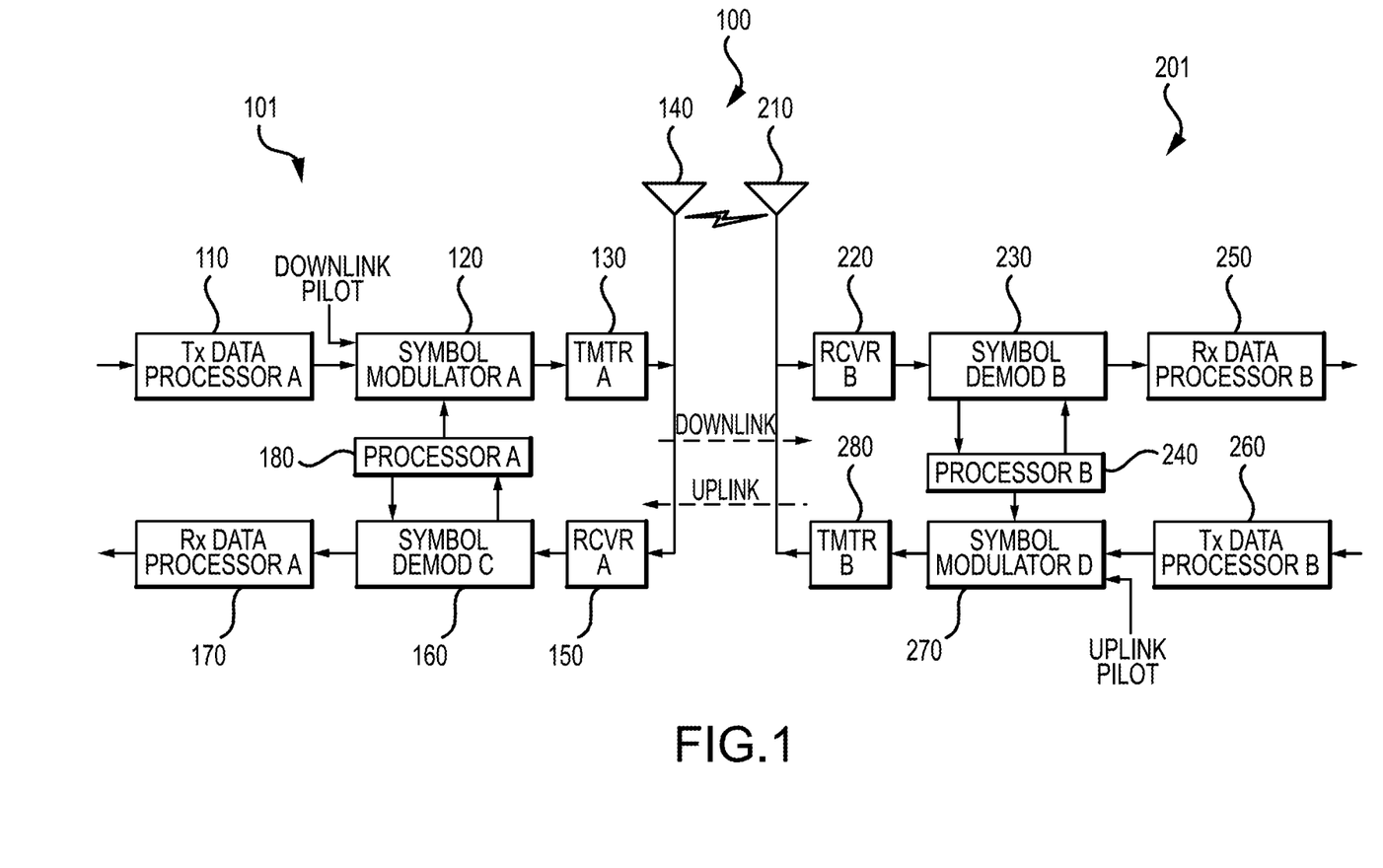
FIG. 1 is a block diagram illustrating an example access node/UE system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (a.k.a. base station) and a user equipment or UE 201 (a.k.a. wireless communication device or mobile station). In the downlink leg, the access node 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
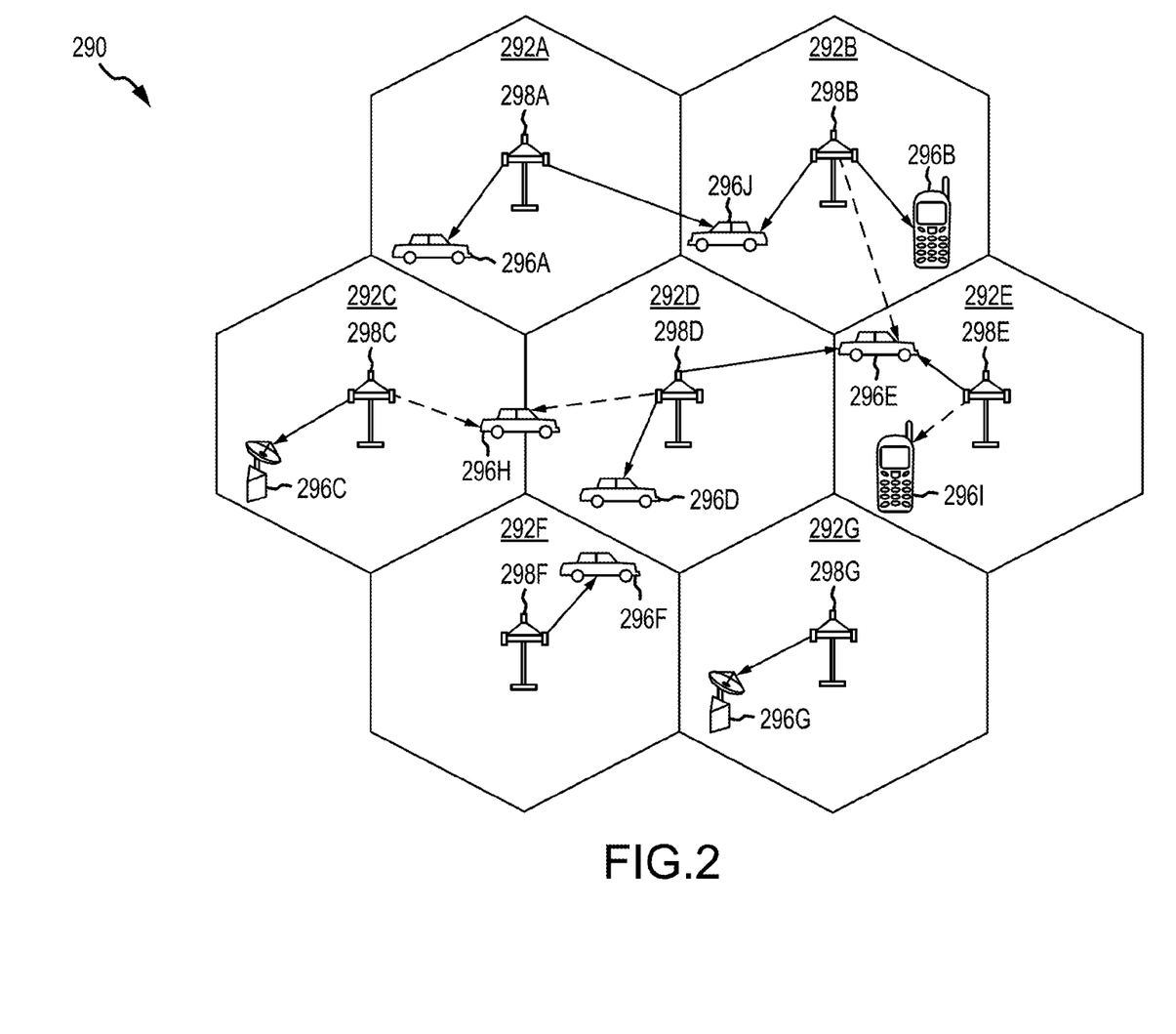
FIG. 2 illustrates an example of a wireless communications system that supports a plurality of users.

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively. Inter-system (i.e., inter-radio access technology (IRAT) transition) handover occurs when an ongoing call is transitioned between a cell of one network and a cell of another network. Such a transition may occur, for example, between a WCDMA site and a GSM site.

Many $4^{th}$ generation (4G) wireless systems, for example, LTE, have adopted universal frequency reuse for greater spectral efficiency. This trend generally increases the interference environment of wireless terminals. In addition, wireless systems often include pilot signals in their downlink transmissions. Pilot signals are used as reference signals in wireless communication systems. For example, a pilot signal may be used as a frequency reference, a time reference, a pseudo-noise (PN) code reference, or a power control reference. In LTE, the pilot signals include the Primary Synchronization Signal, Secondary Synchronization Signal or the Common Reference Signal. However, in some cases, downlink pilot signals may be difficult to detect due to strong interference, known as the hearability problem, causing positioning inaccuracy.

In one conventional solution, the 1xEV-DO (Evolution-Data Optimized) pilot hearability is improved if a pilot interference cancelation technique is used, but the extent of improvement is limited by the channel estimation errors. In another conventional solution, a time diversity technique is used to improve hearability. However, time diversity has the disadvantage of requiring increased processing time. Thus, attaining improved pilot hearability continues to be an issue for many wireless communication systems.

As disclosed herein, a Highly Detectable Pilot (HDP) is used for positioning purposes with improved hearability and location accuracy. A HDP signal may be detected by mobile terminals at a greater distance from the base station than conventional pilot signals. More generally, the use of a HDP signal to improve hearability can be applied to other types of systems, for example, orthogonal frequency division multiplex (OFDM) systems, etc. One skilled in the art would understand that the present disclosure is not limited to any particular wireless communication system, and that the present disclosure is equally applicable to many wireless communication systems without affecting the scope or spirit of the present disclosure.

In one aspect, a cdma2000 1x downlink carrier is spread by a PN sequence at 1.2288 Mchips per second (Mcps) with a sector-specific sector identifier which is aligned with the system time. The Pilot Channel is code division multiplexed and is transmitted continuously at a fraction of the maximum power. In another example, for the cdma 2000 1xEVDO downlink, the Pilot Channel is time division multiplexed and is transmitted in a burst mode with maximum power.

Figure 3:
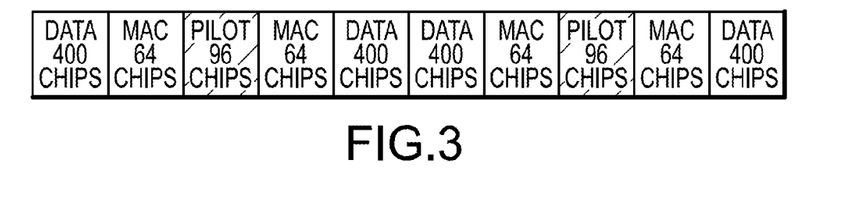
FIG. 3 illustrates an example of a 1xEV-DO downlink slot structure.

FIG. 3 illustrates an example of a 1xEV-DO downlink slot structure. In one example, the 1xEV-DO downlink transmission consists of 2048 chip time slots each with 1.66 ms duration. As shown in FIG. 3, the Pilot, Media Access Control (MAC) and Traffic or Control Channels (within the data portions of the downlink) are time division multiplexed.

Figure 4:
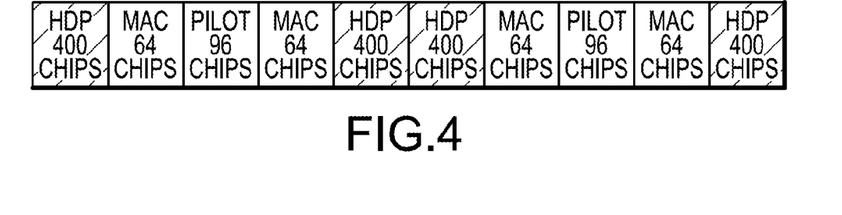
FIG. 4 illustrates an example of a 1xEV-DO highly detectable pilot (HDP) slot structure.

FIG. 4 illustrates an example of a 1xEV-DO highly detectable pilot (HDP) slot structure. As illustrated in FIG. 4, dedicated time slots are allocated for the HDP slots. The HDP channel uses the data portion with a low duty cycle of around 1%. Pilot and MAC channels are maintained for backward compatibility.

The HDP allocated resource can be implemented in many ways, such as time slots, frequency bins, or time-frequency bins. One skilled in the art would understand that the implementations mentioned herein are neither exclusive nor limiting, and that other implementations may be used without affecting the scope or spirit of the present disclosure. In one example, the allocated resource is partitioned into K groups on any full-dimension orthogonal basis. Sectors of a cell are then associated with time-frequency resources.

An HDP opportunity is a subset of the available transmission resources, in time and/or in frequency, that is available for transmission of a HDP signal. One skilled in the art would understand that an HDP opportunity can also be otherwise defined, for example, as a frequency bin, a time slot or a PN code, etc., without affecting the scope or spirit of the present disclosure. In one example, the window duration of a HDP opportunity may depend on the wireless communication system and its modulation/multiple access technique. Within the HDP opportunity, there are subslots available for HDP transmission. In one example, the HDP signal may be transmitted within one of the subslots, and the subslot may be determined by a deterministic function, for example, a hash function. In one aspect, a subslot is a collection of time-frequency resources, for example, one or more OFDM symbols, a set of evenly spaced resource elements in one or more OFDM symbols, etc.

In sector-based HDP multiplexing, one sector of a cell randomly selects one OFDM symbol to transmit the HDP signal. In one example, the random selection is implemented using a hash function of the cell ID. In one example, a hash function maps the cell ID to a lower dimensional value. In sector-based HDP multiplexing, the sectors of the cell do not transmit the HDP signal simultaneously.

In cell-based HDP multiplexing, each cell randomly selects one OFDM symbol to transmit the HDP signal. In one example, the random selection is implemented using a hash function of the cell ID. In this cell-based scheme, more than one sector of the cell simultaneously co-transmit one sector's signature. In one example, the signature is a sector identifier. In addition, for each HDP transmit opportunity, the sector signature may change. One skilled in the art would understand that the example of the OFDM technique mentioned herein is not exclusive and that other communication techniques, such as but not limited to time-division multiplexing (TDM), frequency-division multiplexing (FDM), code-division multiplexing (CDM) or a combination thereof, etc., can also be used without affecting the scope or spirit of the present disclosure.

Figure 5:
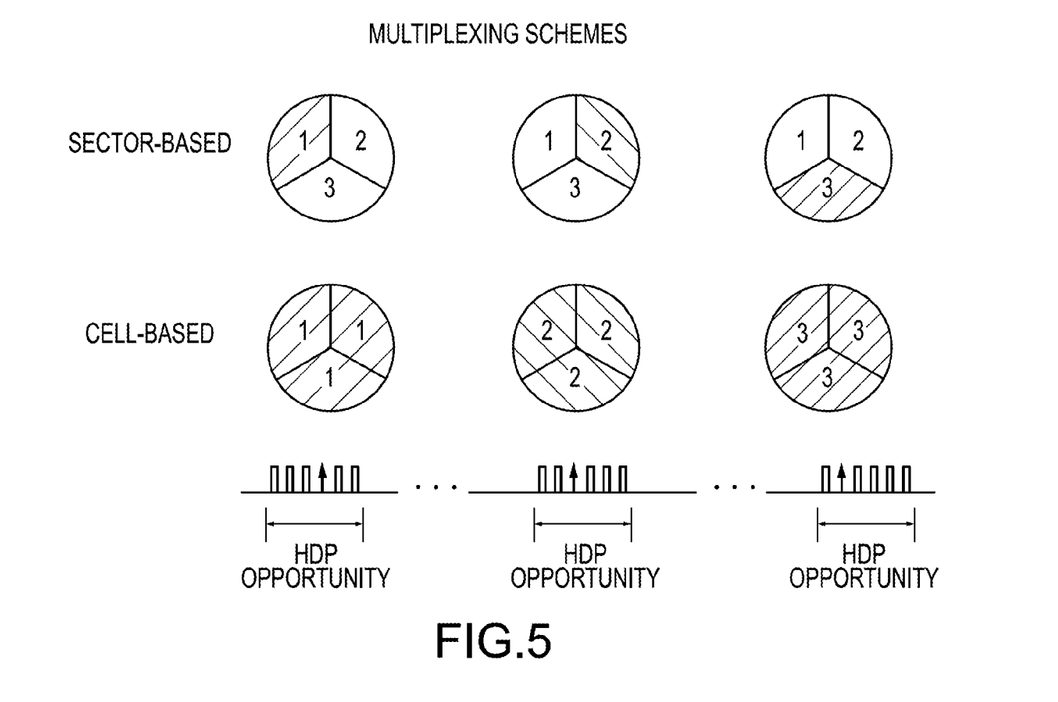
FIG. 5 illustrates the functional difference between sector-based HDP multiplexing and cell-based HDP multiplexing.

FIG. 5 illustrates the functional difference between sector-based HDP multiplexing and cell-based HDP multiplexing. For the sector-based scheme, only one sector transmits the HDP signal at a time, whereas for the cell-based scheme, more than one sector transmit the HDP signal at the same time.

Figure 6:
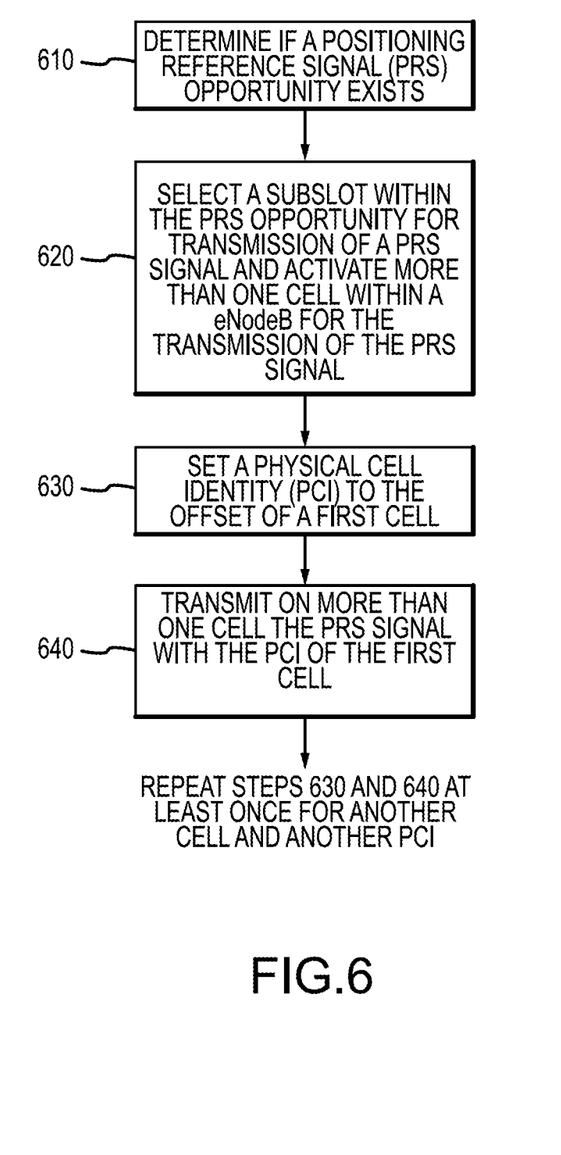
FIG. 6 illustrates an example flow diagram for cell-based PRS multiplexing in a Long Term Evolution (LTE) system.

FIG. 6 illustrates an example flow diagram for cell-based PRS multiplexing in a Long Term Evolution (LTE) system. In block 610, determine if a Positioning Reference Signal (PRS) opportunity exists. Following block 610, in block 620, select a subslot within the PRS opportunity for transmission of a PRS signal and activate-more than one cell within an eNodeB for the transmission of the PRS signal. Following block 620, in block 630, set a Physical Cell Identity (PCI) to the offset of a first cell. Following block 630, in block 640, transmit on more than one cell the PRS signal with the PCI of the first cell. In one aspect, repeat the steps in blocks 630 and 640 at least once for another cell and another PCI.

Figure 7:
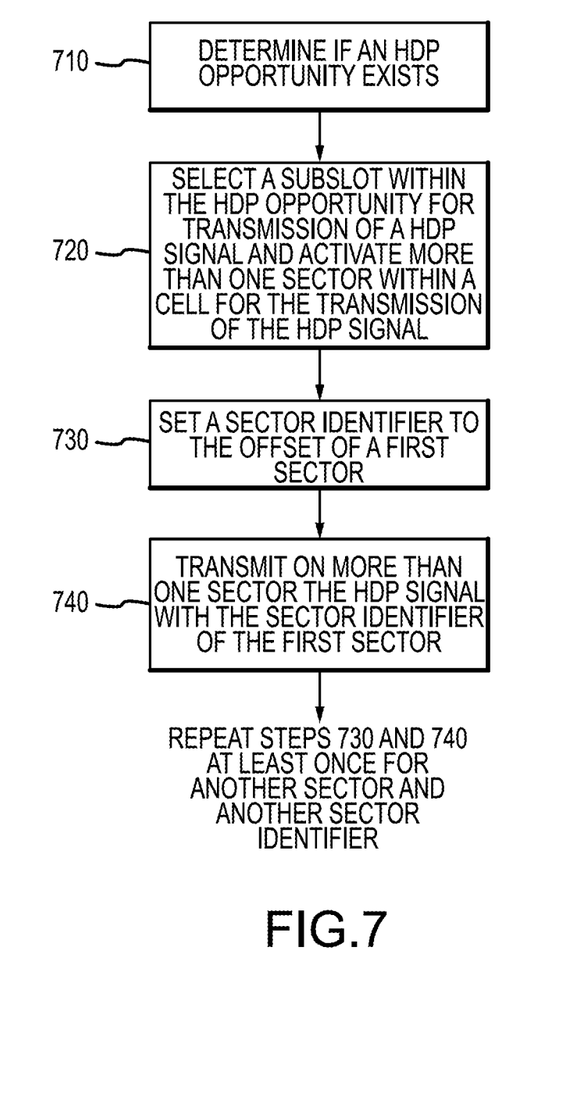
FIG. 7 illustrates an example flow diagram for cell-based HDP multiplexing.

FIG. 7 illustrates an example flow diagram for cell-based highly detectable pilot (HDP) multiplexing. One skilled in the art would understand that the example illustrated in FIG. 7 is applicable to various wireless communication systems, including $4^{th}$ generation wireless communication system (4G) Long Term Evolution (LTE), and other wireless communication systems, such as but not limited to, OFDM systems, UMB (Ultra Mobile Broadband) systems, cdma2000 systems, EVDO systems, etc. In block 710, determine if an HDP opportunity exists. In one example, the HDP opportunity is one of a frequency bin, a time slot or a PN code. In one example, the HDP opportunity is a set of time-frequency resources. In the example of a frequency bin, the HDP opportunity is located between frequency bins that are designated for data. The HDP opportunity (i.e., frequency bin) is then used for transmission of a highly detectable pilot signal. In one example, the step in block 710 can be performed by a processor, such as processor A 180 shown in FIG. 1.

Within the HDP opportunity, there are subslots for transmission of the HDP signal. Following block 710, in block 720, select a subslot within the HDP opportunity for transmission of a HDP signal and activate more than one sector within a cell for the transmission of the HDP signal. In one example, the subslot is selected through a deterministic function. In one variation, the deterministic function is a function of time. The deterministic function has a dynamic characteristic in that a same sector identifier (e.g., PN offset) input at different times will yield different selection of subslots for transmission of the HDP signal. In one other variation, the deterministic function is a hash function. In one aspect, the window duration (e.g., width) of the HDP opportunity is dependent on a wireless communication system, such as in an OFDM communication system, and its modulation/multiple access technique. In one example, the step in block 720 can be performed by a processor, such as processor A 180 shown in FIG. 1.

Following block 720, in block 730, set a sector identifier (e.g., a PN offset) to the offset of a first sector. The first sector is one of the more than one sector activated within the cell. The sector identifier can be considered the "sector signature" for the first sector. In one example, the step in block 730 can be performed by a processor, such as processor A 180 shown in FIG. 1.

Following block 730, in block 740, transmit on more than one sector the HDP signal with the sector identifier of the first sector. The HDP signal is transmitted for a specified time duration on more than one sector of the cell. In one example, the specified time duration is dependent on the wireless communication system, such as an OFDM communication system. In one example, the HDP signal is transmitted using one of time-division multiplexing (TDM), frequency-division multiplexing (FDM), code-division multiplexing (CDM) or a combination thereof. In one example, the step in block 740 can be performed by a transmitter, such as transmitter A 130 shown in FIG. 1.

Following block 740, repeat the steps in blocks 730 and 740 for a another sector in the more than one sector activated within the cell, wherein the another sector is different from the first sector. In one example, a different sector identifier is used for the another sector. One skilled in the art would understand that the steps in blocks 730 and 740 can be repeated for as many times as there are activated sectors within the cell.

In one example, cell-based HDP multiplexing can be extended to other wireless communication systems such as, but not limited to, the third generation (3G) and the fourth generation (4G) wireless communication systems using standards being developed by 3GPP and 3GPP2, for example, OFDM systems, LTE (Long Term Evolution) systems and UMB (Ultra Mobile Broadband) systems, cdma2000, EVDO, etc. One skilled in the art would understand that the present disclosure is not limited to a particular type or generation of wireless communication systems, and as such, is applicable to any wireless communication system that uses the features disclosed herein.

One skilled in the art would understand that the steps disclosed in the example flow diagram in FIG. 7 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 8:
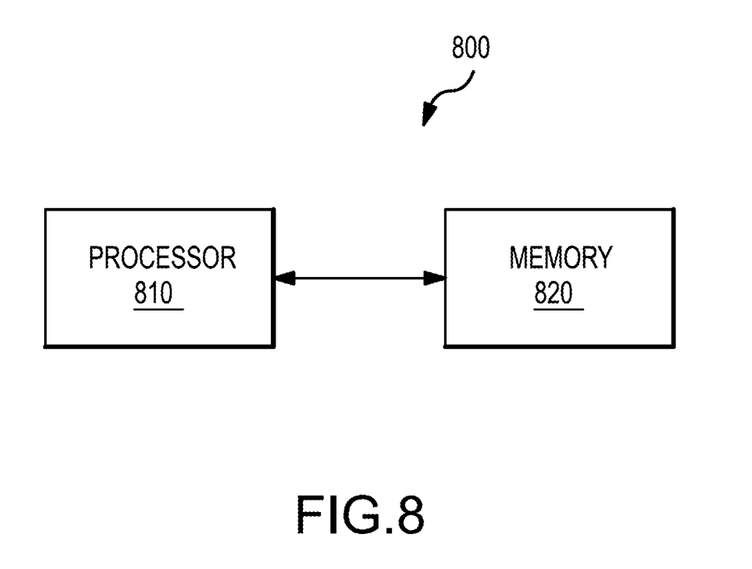
FIG. 8 illustrates an example of a device comprising a processor in communication with a memory for executing the processes for cell-based highly detectable pilot (HDP) multiplexing.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 8 illustrates an example of a device 800 comprising a processor 810 in communication with a memory 820 for executing the processes for cell-based highly detectable pilot (HDP) multiplexing. In one example, the device 800 is used to implement the algorithm illustrated in FIG. 7. In one aspect, the memory 820 is located within the processor 810. In another aspect, the memory 820 is external to the processor 810. In one aspect, the processor includes circuitry for implementing or performing the various flow diagrams, logical blocks and/or modules described herein.

Figure 9:
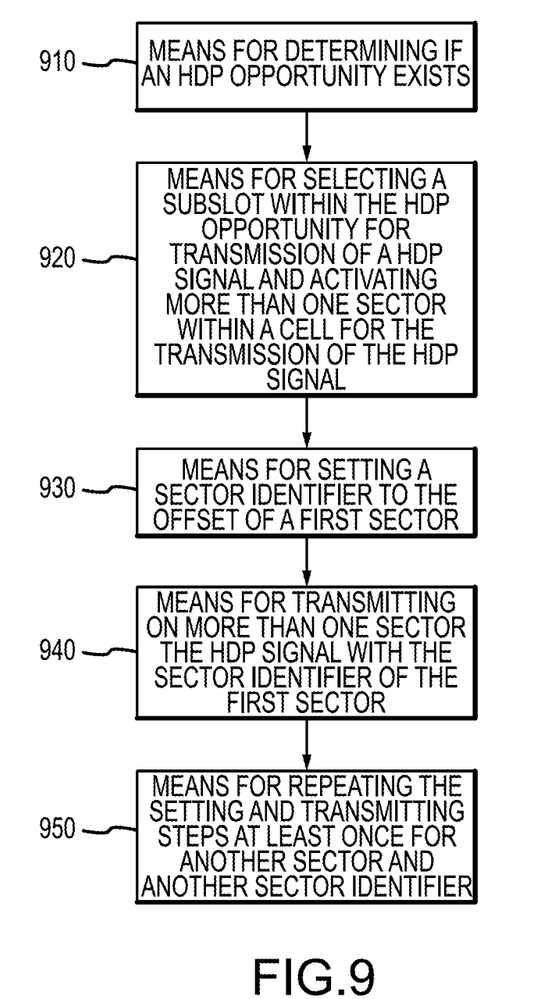
FIG. 9 illustrates an example of a device suitable for cell-based highly detectable pilot (HDP) multiplexing.

FIG. 9 illustrates an example of a device 900 suitable for cell-based highly detectable pilot (HDP) multiplexing. In one aspect, the device 900 is implemented by at least one processor comprising one or more modules configured to provide different aspects of cell-based highly detectable pilot (HDP) multiplexing as described herein in blocks 910, 920, 930, 940 and 950. For example, each module comprises hardware, firmware, software, or any combination thereof. In one aspect, the device 900 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for cell-based highly detectable pilot (HDP) multiplexing comprising:
   determining if an HDP opportunity exists;
   selecting a subslot from a series of subslots, wherein each subslot may be used for an HDP pilot signal within the HDP opportunity for transmission of a HDP signal and wherein the subslot is selected through a deterministic function;
   setting a first sector identifier in the HDP signal to an offset of a first sector of a cell; and transmitting the HDP signal in the selected subslot with the first sector identifier from the first sector of the cell and from a second sector of the cell, wherein the second sector of the cell is a different sector of the cell than the first sector of the cell.

2. The method of claim 1 further comprising transmitting on the more than one sector a common sequence based on a cell identifier for the cell.

3. The method of claim 1 wherein the HDP opportunity is a set of time-frequency resources.

4. The method of claim 1 wherein the HDP opportunity is a frequency bin located between two frequency bins designated for data transmission.

5. The method of claim 1 wherein the deterministic function is a function of time.

6. The method of claim 1 wherein the subslot is selected through a hash function.

7. The method of claim 1 wherein the cell is part of a wireless communication system which is one of a 1X system, a 1xEV-DO system, an OFDM system, a LTE (Long Term Evolution) system or a UMB (Ultra Mobile Broadband) system.

8. The method of claim 7 wherein the HDP signal is transmitted using one of time-division multiplexing (TDM), frequency-division multiplexing (FDM), code-division multiplexing (CDM) or a combination thereof.

9. The method of claim 1 further comprising:
setting a second sector identifier in the HDP signal to an offset of the second sector;
transmitting the HDP signal with the second sector identifier on more than one sector wherein the second sector identifier is different from the first sector identifier.

10. The method of claim 9 further comprising:
setting a third sector identifier in the HDP signal to an offset of a third sector;
transmitting the HDP signal with the third sector identifier on the more than one sector, wherein the third sector identifier is different from the first and second sector identifiers, and the third sector is different from the first and second sectors.

11. An apparatus for cell-based highly detectable pilot (HDP) multiplexing, the apparatus comprising one or more processors:
for determining if an HDP opportunity exists;
for selecting a subslot from a series of subslots, wherein each subslot may be used for an HDP pilot signal within the HDP opportunity for transmission of a HDP signal and wherein the subslot is selected through a deterministic function;
for setting a first sector identifier in the HDP signal to an offset of a first sector of a cell; and
for transmitting the HDP signal in the selected subslot with the first sector identifier from the first sector of the cell and from a second sector of the cell, wherein the second sector of the cell is a different sector of the cell than the first sector of the cell, and wherein the HDP signal comprises a positioning signal.

12. The apparatus of claim 11 wherein the transmitter further transmits on the more than one sector a common sequence based on a cell identifier for the cell.

13. The apparatus of claim 11 wherein the HDP opportunity is a set of time-frequency resources.

14. The apparatus of claim 11 wherein the HDP opportunity is a frequency bin located between two frequency bins designated for data transmission.

15. The apparatus of claim 11 wherein the deterministic function is a function of time.

16. The apparatus of claim 11 wherein the processor uses a hash function for selecting the subslot.

17. The apparatus of claim 11 wherein the apparatus is part of a wireless communication system which is one of a 1X system, a 1xEV-DO system, an OFDM system, a LTE (Long Term Evolution) system or a UMB (Ultra Mobile Broadband) system.

18. The apparatus of claim 17 wherein the HDP signal is transmitted using one of time-division multiplexing (TDM), frequency-division multiplexing (FDM), code-division multiplexing (CDM) or a combination thereof.

19. The apparatus of claim 11 wherein
the processor sets a second sector identifier in the HDP signal to an offset of the second sector;
the transmitter transmits the HDP signal with the second sector identifier on more than one sector;
wherein the second sector identifier is different from the first sector identifier, and the second sector is different from the first sector.

20. The apparatus of claim 19 wherein
the processor sets a third sector identifier in the HDP signal to an offset of a third sector;
the transmitter transmits the HDP signal with the third sector identifier on the more than one sector;
wherein the third sector identifier is different from the first and second sector identifiers, and the third sector is different from the first and second sectors.

21. The apparatus of claim 11 wherein the apparatus is a femtocell.

22. A apparatus for cell-based highly detectable pilot (HDP) multiplexing comprising:
means for determining if an HDP opportunity exists;
means for selecting a subslot from a series of subslots, wherein each subslot may be used for an HDP pilot signal within the HDP opportunity for transmission of a HDP signal and wherein the subslot is selected through a deterministic function;
means for setting a first sector identifier in the HDP signal to an offset of a first sector; and
means for transmitting the HDP signal in the selected subslot with the first sector identifier from the first sector of the cell and from a second sector of the cell, wherein the second sector of the cell is a different sector of the cell than the first sector of the cell.

23. The apparatus of claim 22 further comprising means for transmitting on the more than one sector a common sequence based on a cell identifier for the cell.

24. The apparatus of claim 22 wherein the HDP opportunity is a set of time-frequency resources.

25. The apparatus of claim 22 wherein the HDP opportunity is a frequency bin located between two frequency bins designated for data transmission.

26. The apparatus of claim 22 wherein the deterministic function is a function of time.

27. The apparatus of claim 22 wherein the means for selecting the subslot uses a hash function.

28. The apparatus of claim 22 wherein the apparatus is part of a wireless communication system which is one of a 1X system, a 1xEV-DO system, an OFDM system, a LTE (Long Term Evolution) system or a UMB (Ultra Mobile Broadband) system.

29. The apparatus of claim 28 wherein the means for transmitting uses one of time-division multiplexing (TDM), frequency-division multiplexing (FDM), code-division multiplexing (CDM) or a combination thereof for transmitting the HDP signal.

30. The apparatus of claim 22 further comprising
means for setting a second sector identifier in the HDP signal to an offset of the second sector;
means for transmitting the HDP signal with the second sector identifier on more than one sector wherein the second sector identifier is different from the first sector identifier, and the second sector is different from the first sector.

31. The apparatus of claim 30 further comprising
means for setting a third sector identifier in the HDP signal to an offset of a third sector;
means for transmitting the HDP signal with the third sector identifier on the more than one sector, wherein the third sector identifier is different from the first and second sector identifiers, and the third sector is different from the first and second sectors.

32. A non-transitory computer-readable storage medium having a computer program comprising instructions, which when executed by at least one processor, operates cell-based highly detectable pilot (HDP) multiplexing, the computer program comprising:
instructions for determining if an HDP opportunity exists;
instructions for selecting a subslot from a series of subslots, wherein each subslot may be used for an HDP pilot signal within the HDP opportunity for transmission of a HDP signal and wherein the subslot is selected through a deterministic function;
instructions for setting a first sector identifier in the HDP signal to an offset of a first sector of a cell; and
instructions for transmitting the HDP signal in the selected subslot with the first sector identifier from the first sector of the cell and from a second sector of the cell, wherein the second sector of the cell is a different sector of the cell than the first sector of the cell.

33. The non-transitory computer-readable storage medium of claim 32 further comprising instructions for transmitting on the more than one sector a common sequence based on a cell identifier for the cell.

34. The non-transitory computer-readable storage medium of claim 32 further comprising
instructions for setting a second sector identifier in the HDP signal to an offset of the second sector;
instructions for transmitting the HDP signal with the second sector identifier on more than one sector wherein the second sector identifier is different from the first sector identifier, and the second sector is different from the first sector.

35. The non-transitory computer-readable storage medium of claim 34 further comprising
instructions for setting a third sector identifier in the HDP signal to an offset of a third sector;
instructions for transmitting the HDP signal with the third sector identifier on the more than one sector, wherein the third sector identifier is different from the first and second sector identifiers, and the third sector is different from the first and second sectors.

* * * * *